3,660,336
PROCESS FOR BLENDING HIGH MOLECULAR WEIGHT POLYETHYLENE INTO WAX, AND WAX COATING COMPOSITION PRODUCED THEREFROM
Stewart J. Gonta, Marina Del Rey, and Thomas Hallis, Jr., and Lawrence S. Johnson, Brea, Calif., assignors to Union Oil Company of California, Los Angeles, Calif.
No Drawing. Continuation-in-part of abandoned application Ser. No. 680,975, Nov. 6, 1967. This application Nov. 27, 1970, Ser. No. 93,032
Int. Cl. C08f 45/52
U.S. Cl. 260—28.5
6 Claims

ABSTRACT OF THE DISCLOSURE

Low concentrations of high molecular weight, high density polyethylenes are incorporated into wax compositions used for coatings. A stable colloidal dispersion of the polyethylene is prepared by blending the same in powdered form into the wax at below the congealing temperature of the polymer, and then heating the wax-polymer blend until the polymer melts. The properties of the wax coating combine high viscosity with adhesion and gloss at a lowered cost of the polymeric additive.

RELATED APPLICATIONS

This application is a continuation-in-part of Ser. No. 680,975, filed Nov. 6, 1967, now abandoned.

This invention relates to a new and improved wax coating composition and the process for its manufacture. More specifically, this invention relates to paraffin wax compositions incorporating a stable, colloidal dispersion of linear, high molecular weight polyethylene.

The use of wax as a paperboard coating has a significant cost advantage over polyethylene and other high polymeric materials, the wax being cheaper by at least ten cents a pound. In addition, wax coatings for paperboard and similar materials are much easier to apply than polyethylene; moreover because of its transparency, the wax can be applied to a substrate which has already been printed. In the case of polyethylene film, the surface of the film must be treated prior to printing in order to render it receptive to printing inks. The use of a wax coating makes it far easier to provide a good heat seal than when using a polyethylene coating.

Wax coated paperboard and paper materials find their uses in applications where high gloss and a good moisture barrier are required and consequently waxes are employed for coating and impregnating frozen food packages, corrugated paperboard, margarine containers, milk cartons, etc. One problem associated with these wax coatings is the excessive cost of additives used to impart properties such as high melt viscosity, flexibility, adhesion and gloss. The cost of the additives range from 15 to 50 cents per pound, and when employed at about a 10% level, raise the price of the wax coating by about 15% since the additives are considerably more expensive than the wax itself.

The wax-polymer compositions are particularly designed for use in the hot-melt, curtain coating technique which is advantageously used to apply a thin continuous film of wax-polymer blend to corrugated board. In this technique, the paperboard is drawn horizontally and rapidly through a falling continuous curtain of molten wax, and to obtain a thin continuous film on the paperboard it is important that the molten wax blend have the proper viscosity at the application temperature. Too low a viscosity results in a weak curtain which is easily broken by the corrugated board resulting in "holidays" (areas of uncoated board). Too high a viscosity results in poor coverage of deep scores producing a thin "skin" of film over the score.

It is of course a simple matter to control viscosity of a wax blend by adjusting temperature. However, for successful curtain coating it is desirable to employ temperatures considerably above the melting point of the wax blend, preferably in the range of about 250–400° F., and still more preferably about 300–375° F. The higher temperatures give better adhesion to the paperboard. To operate at these relatively high temperatures and still maintain the proper melt viscosity (preferably in the range of about 100–200 centipoises at 250° F.), a viscosity-increasing polymer such as polyethylene or polypropylene is added to the melt. To obtain the desired viscosity using low molecular weight polyethylenes requires the use of excessive amounts of polymer. It would be highly desirable to obtain operative viscosities with a minimum of polymer. This suggests the use of the ultra high molecular weight polyethylenes having average molecular weights above 500,000 and preferably above 1,000,000.

Polyethylene as it is generally known today is divided into two general classes: Low density polyethylene made under extremely high pressure using free radical forming catalysts, and the high density polyethylenes produced at low pressures using coordination catalysts. Generally, the higher the density, the lower the number of branches and the higher the degree of crystallinity. A high density polyethylene of 95% crystallinity and 0.96 density exhibits a higher melting point, higher tensile strength, higher flexural modules and greater hardness than a low density polyethylene of 65% crystallinity and 0.92 density. For purposes of this invention it is desired to use the high density polyethylenes having weight average molecular weights above about 500,000 and preferably above 1,000,000; the density should be above about 0.94, and crystallinity above about 80%.

In the past great difficulty has been encountered in obtaining stable, homogeneous dispersions of these linear, high density polyethylenes in paraffin wax blends. No problem is encountered in obtaining stable uniform dispersions of polyethylenes of below about 500,000 molecular weight; the wax is merely melted and heated to above the melting point of the polyethylene which is then simply stirred into the wax in the form of powder, pellets or any other desired form. After a few minutes of stirring, the polyethylene forms a homogeneous solution or dispersion therein.

However, in the case of the ultra high molecular weight polyethylenes employed herein this technique is completely unsuccessful. Even if the high molecular weight polyethylene is in a finely powdered form, and is added to the wax with stirring, but at a melt temperature above the melting point of the polymer, the particles thereof instead of going into dispersion tend to coalesce and cannot be uniformly dispersed in the melt. Instead, the polymer acts as a thixotropic agent causing the whole mixture to form a thick gel structure which cannot be broken down by further agitation or heating. This thick gel "climbs" the sides of the container and the stirring blades, either overflowing the container or being flung off the stirrer by centrifugal motion, preventing any further attempt to blend the materials. Upon cooling and standing, it is found that the polymer has not been finely dispersed within the wax but rather tends to crystallize out of the blend in lumps forming a heterogeneous mixture, thus reducing the adhesive strength of the film and reducing flexibility and toughness thereof.

We have now discovered that the above difficulties can be completely avoided, and stable, homogeneous colloidal dispersions of ultra high molecular weight polyethylenes in waxes can be obtained by the techniques described herein. Firstly, the polyethylene must be in a suitably finely powdered form. The term "powder" is defined herein as meaning a state of subdivision such that all of the particles will pass through a 20 mesh U.S. standard screen, and that at least about 80 weight-percent thereof will pass through a 40 mesh screen. This means that for practical purposes the maximum particle size is about 1/32-inch, and preferably less than 1/64-inch. Secondly, it has been found essential (1) that the powdered polymer first be thoroughly dispersed in the molten wax at a temperature below the congealing point of the polymer and then, (2) while continuously agitating the mixture to maintain dispersion, to raise the temperature of the mixture to above the melting point of the polymer. When the congealing point of the polymer is reached, the blend goes through a gel state where it becomes very viscous but is still stirrable; the polyethylene at this point appears to act as a thixotropic agent. Upon raising the temperature further with continued agitation, the gel begins to break, the mixture becomes easier to handle and the polyethylene becomes thoroughly and uniformly dispersed as a colloid in the wax, and upon cooling does not tend to crystallize out.

From the foregoing it will be apparent that the major object of the invention is to provide a wax composition containing stable, colloidally dispersed high molecular weight linear polyethylene, and a process for producing such composition.

A further object is to provide a wax composition which may be curtain-coated on a paperboard surface at a temperature high enough to give good bonding onto the surface thereof. A further objective is to provide economical means for increasing the viscosity of wax coating compositions for use at coating temperatures above about 300° F.

Other objects of the invention will become apparent from the remaining description.

Substantially any conventional type of petroleum paraffin wax may be employed herein. One particularly preferred type contains about 60 carbon atoms per molecule, has a molecular weight of about 500, and is marketed as Aristowax 143/150 by Union Oil Company of California. Microcrystalline waxes may also be employed, for example a type having a molecular weight of about 1500 and a needle penetration point of 9 (ASTM–1321–65). Microcrystalline waxes promote heat sealability and impart improved gloss to the coated products. Blends of paraffin wax and microcrystalline waxes may also be employed. One preferred type of blend is known as Smith's Bluff 180 DOM, and is sold by the Union Oil Company of California.

Other wax-compatible polymers and/or copolymers may be employed in the composition to impart toughness and flexibility to the blend. In addition, such polymers promote heat sealability and resistance to moisture. One suitable polymer system comprises equal amounts of an (72%) ethylene (28%) vinyl acetate copolymer and an (82%) ethylene (18%) vinyl acetate copolymer. These two materials are sold by the E. I. du Pont de Nemours Company under the trade names of Elvax 260 and Elvax 460, respectively. The copolymers may vary in concentration up to 10% in the wax blend. Another suitable copolymer system is an ethylene-ethyl acrylate copolymer in the same proportions and the same concentration range as the ethylene-vinyl acetate copolymer. Other copolymers may also be employed in the blend provided they impart the charateristics of toughness, flexibility, heat sealability and moisture resistance.

Low molecular weight polyethylenes having mean molecular weights of about 2,000 to 500,000 may be employed along with the ethyelne-vinyl acetate copolymer. A suitable polyethylene is sold by the Allied Chemical Company under the brand name of A–C6 polyethylene. It is used in concentrations up to about 5% to impart hardness to the blend. However, if the concentration limit is exceeded, or if the density or molecular weight is increased significantly, the wax blend tends to become too brittle. Similarly, a copolymer of vinyl toluene and α-methyl styrene may be used in place of A–C6 polyethylene.

Additional additives may be employed although they do not affect the scope of the invention and include antioxidants such as butylated hydroxy anisol and butylated hydroxy toluene, antiblocking additives such as diatomaceous silica, anti-scuff agents, slip agents, etc.

Typical suitable formulations of wax and high molecular weight polyethylene include:

| Example | Composition | Wt. percent |
|---|---|---|
| 1 | Aristowax 143/150 | 94.5 |
|   | Elvax 460 | 5.0 |
|   | AC1220 polyethylene | 0.5 |
| 2 | Aristowax 143/150 | 90.75 |
|   | Elvax 460 | 8.5 |
|   | AC1220 polyethylene | 0.75 |
| 3 | Aristowax 143/150 | 49.5 |
|   | Smiths Bluff 180 DOM | 49.0 |
|   | AC1220 polyethylene | 1.5 |
| 4 | Smiths Bluff 180 DOM | 98 |
|   | AC1200 polyethylene | 2 |

AC1220 is the trademark name of Allied Chemical Company for a polyethylene having a weighted average molecular weight of 1,500,000.

Operative proportions of the high molecular weight polyethylenes employed herein may range between about 0.3 and 5%, preferably about 0.5–2.5% by weight of the total blend.

OPERATING EXAMPLE

In a typical case a 400 pound capacity oil jacketed blender with rotary scraper blades and recirculation gear pump is employed. The wax (300 pounds) is heated and just before the last of it melts (about 140°–160° F.) 3 pounds of AC1220 polyethylene in powdered form (90% passing through a 40 mesh U.S.S. screen) is added. The blending kettle blades are rotated and the recirculation pump started. At this low temperature the AC1220 polyethylene powder is dispersed throughout the wax without the particles coalescing together. The temperature is then increased to about 260° F. and the blend then forms a gel and becomes very viscous due to the polyethylene behaving somewhat as a thixotropic agent. At about 270° F. the gel begins to break and at 310° F. the mixture becomes less viscous and easier to handle; at this temperature the polymer has become colloidally dispersed and remains dispersed even when the mixture has cooled.

When the above procedure is repeated, except that the polyethylene is added at a melt temperature of 270° F., visible blobs of polymer form almost immediately, and the entire mixture thickens up and clings to the scraper blades and kettle walls, and is impossible to break down into a colloidal dispersion. When the product is cooled, crystalline polyethylene precipitates out.

The coatings of the present invention may be applied at thicknesses which require only about 6–8 pounds per 1000 square feet. This is considerably less than prior art wax-polymer blend coatings which require 10 pounds per 1000 square feet. Furthermore, the present coatings form a highly adherent bond to the paperboard. The coatings are flexible, have high gloss and good transparency. They are also less expensive by about 15% than prior art wax-polymeric blends, and this represents a significant cost reduction feature.

The following claims are believed to define the true scope of the invention:

We claim:

1. A process for preparing a stable dispersion in petroleum wax of a polyethylene having an average molecular weight between about 500,000 and 1,500,00 and a density above about 0.94 which comprises:

(1) adding said polyethylene in powdered form to the molten petroleum wax at a melt temperature which is below the melting point of the polyethylene; and (2) while continuously agitating said mixture to maintain said polyethylene powder thoroughly dispersed therein, raising the temperature of the mixture to above the melting point of the polyethylene, and continuing to agitate said mixture at a temperature above said melting point for a time sufficient to form a stable colloidal dispersion of polyethylene in said wax.

2. A process as defined in claim 1 wherein said powdered polyethylene is subdivided to a state such that at least about 80 weight-percent thereof will pass through a 40 mesh U.S.S. screen.

3. A process as defined in claim 1 wherein said polyethylene is used in amounts of about 0.3 to 5 weight-percent of said wax.

4. A process as defined in claim 1 wherein said wax is selected from the class consisting of paraffin wax and microcrystalline wax.

5. A process as defined in claim 1 wherein a wax-compatible copolymer selected from the group consisting of ethylene-vinyl acetate ethylene-ethyl acrylate is also added to said molten wax.

6. A process as defined in claim 1 wherein said polyethylene powder is first dispersed in the molten wax at temperatures ranging from about 140° to about 160° F., and wherein the temperature of the mixture is then raised at least into the range of about 260° to 310° F. while continuously agitating the mixture.

References Cited

UNITED STATES PATENTS

| | | | |
|---|---|---|---|
| 3,355,405 | 11/1967 | Tyran | 260—28.5 AV |
| 3,536,645 | 10/1970 | Miller | 260—28.5 A |
| 3,338,855 | 8/1967 | Kray | 260—28.5 A |
| 3,326,834 | 6/1967 | Signorelli | 260—28.5 A |
| 3,407,161 | 10/1968 | Rundle | 260—28.5 A |
| 3,554,950 | 1/1971 | Sauer | 260—28.5 R |

MORRIS LIEBMAN, Primary Examiner

P. R. MICHL, Assistant Examiner

U.S. Cl. X.R.

260—28.5 AV